Feb. 25, 1958  R. W. McKEE  2,824,979
ULTRASONIC FISSURE DETECTOR
Filed Dec. 19, 1955  3 Sheets-Sheet 1

INVENTOR.
Richard W. McKee
BY
Atty.

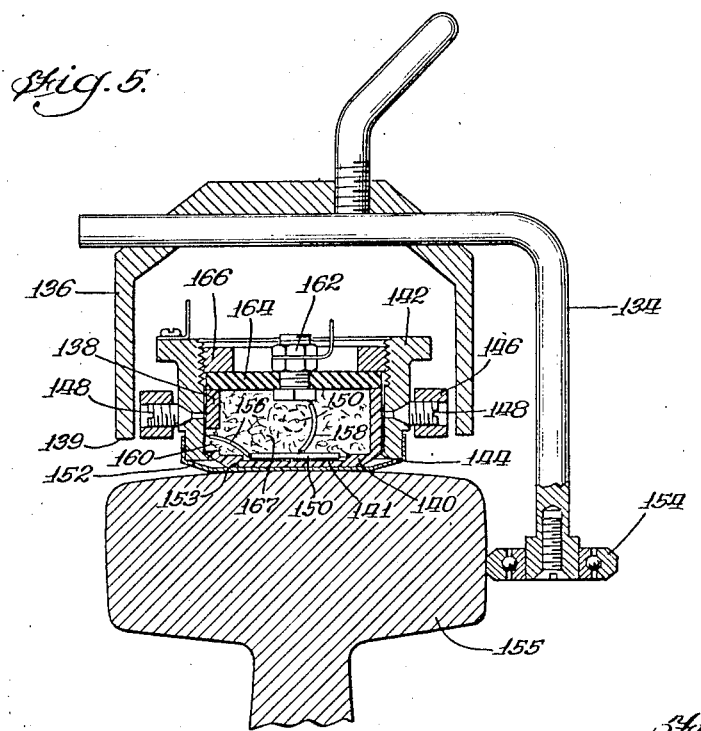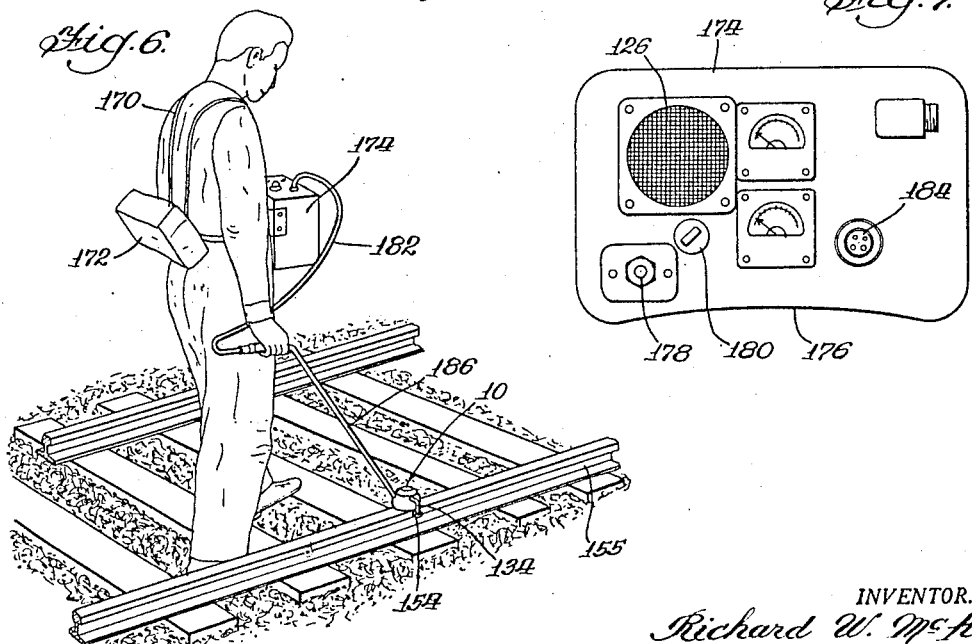

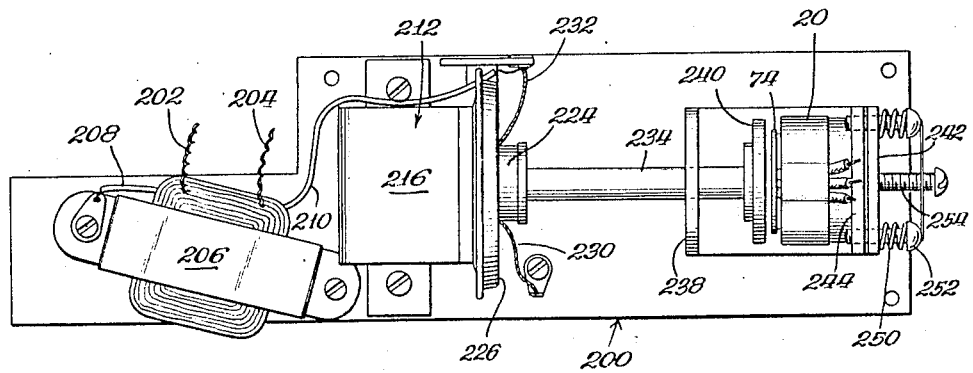
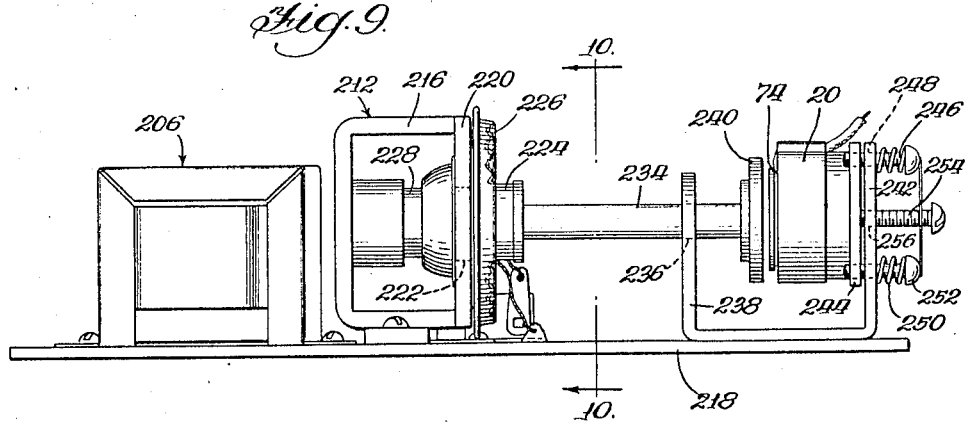
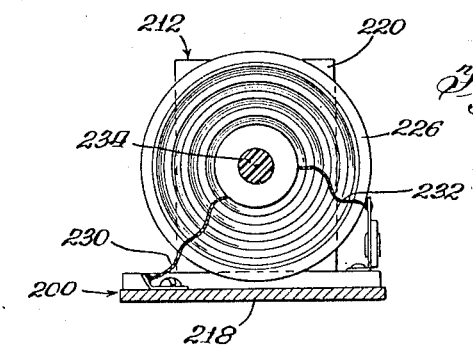

United States Patent Office 2,824,979
Patented Feb. 25, 1958

2,824,979
ULTRASONIC FISSURE DETECTOR

Richard W. McKee, Winnetka, Ill., assignor to Welding Service, Inc., Chicago, Ill., a corporation of California Application December 19, 1955, Serial No. 553,885

5 Claims. (Cl. 310—8.1)

This invention relates to an ultrasonic fissure detector for rails, and particularly to a light portable device for detecting the presence of fissures in the joint bar area of rails lying in track.

Since the inception of fissure detection in rails lying in a track early in the 1920's, the joint bar area has created problems. The major systems of fissure detection, i. e. the direct current system, the residual testing system, and the sustained magnetic testing system, have all tried various means for detecting fissures in the joint bar area while a fissure detector car has passed over it. The reliability of the results have not been comparable to that attained in the clear rail area. The bolt holes, nuts and bolts, tie plates, joint bars, and electric conduits at the joints so modify the magnetic fields traversed by the pickup coil that the percentage of misinformative signals received on the tape of a fissure detector car is excessively high.

More recently, the rail joint problem has been assigned to a maintenance of way foreman. Under standard practice, a number of miles of track are assigned to a foreman whose crew rides in a handcar or walks along the assigned track at least weekly. The proposal is to provide each crew with a portable fissure detector which can be carried by a single man who manually checks each joint in the track.

These portable fissure detectors are of the ultrasonic type. Each injects into a rail a signal from a frequency modulated, self-excited oscillator which is oscillating at a frequency which sets up resonant oscillations in the rail. The load upon the oscillator changes when the signals encounted a fissure in the rail, thus changing the frequency of the oscillator. This change in frequency is then an indication of the presence of a fissure.

In order for a device of this type to function properly, it is necessary to provide frequency shifting means which are reliable under service conditions, and it is highly desirable that this means be simple and of low cost construction. The frequency modulation of the oscillator in such devices have utilized rotating condensers connected in parallel with the tank coil of the variable frequency oscillator. In such a construction, however, an electric motor is employed to rotate the condenser plates, and electric motors cause noise in the detecting means, as well as mechanical troubles, such as bearing failures. It is, therefore, one of the objects of the present invention to provide means to frequency modulate a self-excited oscillator which does not employ a motor, or switch contacts, which has a long life, provides reliable operation, and which does not introduce noise into the detecting means.

Another object of the present invention is to provide a new and improved transmitting means. Vibrating crystals, generally of quartz, are usually employed to transmit the wave to the body under test. As a result, it is necessary that the crystal be placed in close proximity to the body of material under test, thus subjecting the housing for the crystal to considerable wear. It is thus a further object of the present invention to provide a detecting means using a crystal which permits the crystal to be disposed in close proximity to the body under test and at the same time resists wear and protects the crystal from injury.

These and such other objects of the invention will be more fully understood from a further reading of the present disclosure, particularly when viewed in the light of the drawings, in which:

Figure 5 is a sectional view of the transducer positioned on a rail, the transducer being illustrated diagrammatically in Figure 1;

Figure 6 is a perspective view illustrating an operator holding one of applicant's devices against the ball of a rail at a joint;

Figure 7 is a face view of the control unit;

Figure 8 is a plan view illustrating an electromagnetic assembly for modulating the oscillator of the device illustrated in Figure 1;

Figure 9 is a front elevational view of the electromagnetic assembly shown in Figure 8; and Figure 10 is a sectional view taken along the line 10—10 of Figure 9.

Figure 1:
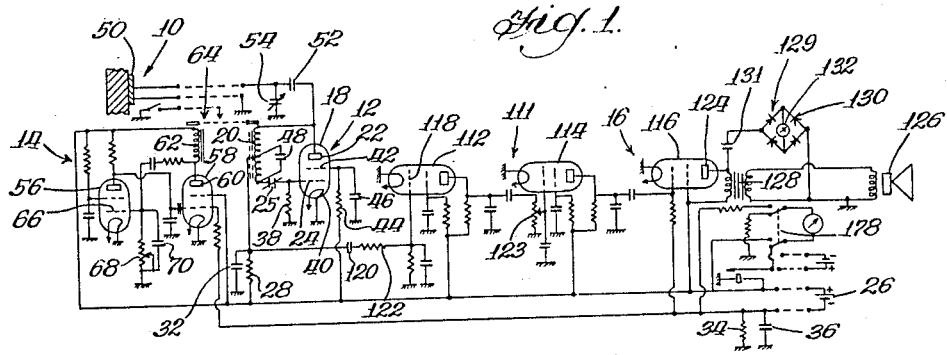
Figure 1 is a schematic electrical diagram of a device for detecting internal fissures in a rail constructed according to the teachings of the present invention.

The device for detecting fissures in rails, schematically illustrated in Figure 1, includes four principal interconnected units; first, a transducer 10; second, an oscillator 12; third, a modulator 14, and fourth, an indicating means 16.

The oscillator 12 employs a pentode vacuum tube 18 having a center tapped coil 20 connected between a plate 22 and control grid 24, a condenser 25 being connected between the grid 24 and the coil 20. The center tap of the coil 20 is also connected to the positive terminal of a D. C. power source, such as battery 26, through a resistor 28 and to an electrically conducting chassis, symbolically illustrated, through a condenser 32. The negative terminal of the power source 26 is also connected to the chassis through a resistor 34 and a condenser 36. A grid bias resistor 38 is connected between the grid 24 and the chassis. Also, one end of the filament 40 of the vacuum tube 18, which serves as a current return electrode, is also connected to the chassis. The screen grid 42 of vacuum tube 18 is connected to the positive terminal of battery 26 through a resistor 44 and to the chassis through condenser 46. Condenser 48 is connected between the tap and the grid end of the coil 20.

The transducer 10 uses a quartz crystal 50 which has one terminal connected to the plate 22 of vacuum tube 18 through a coupling condenser 52, and the other terminal of the crystal 50 is connected to the chassis. A variable condenser 54 is also connected in parallel with the crystal 50.

Figure 4:
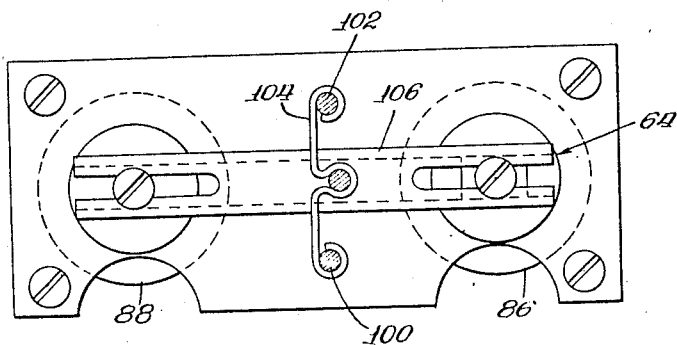
Figure 4 is a plan view of the modulating means illustrated in Figures 2 and 3.

The modulator 14 employs a conventional oscillator circuit having vacuum tubes 56 and 58. Vacuum tube 58 has a plate 60 which is connected to the positive terminal of the battery 26 through the coil 62 of an electromagnetic assembly 64, more clearly illustrated in Figures 2, 3 and 4. The control grid 66 of vacuum tube 56 of the modulator 14 is electrically connected to the chassis through a variable resistor 68 and condenser 70 connected in parallel. Since the other details of the oscillator are conventional, it will not be further described.

Figure 2:
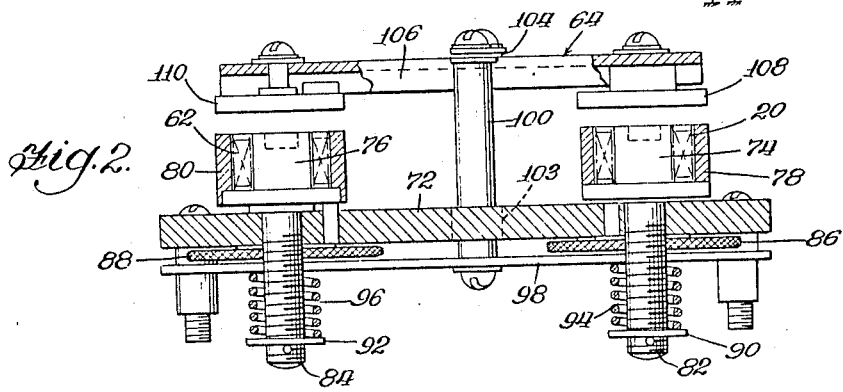
Figure 2 is a sectional view illustrating the mechanical construction of the modulation means for the oscillator of the device illustrated in Figure 1.
Figure 3:
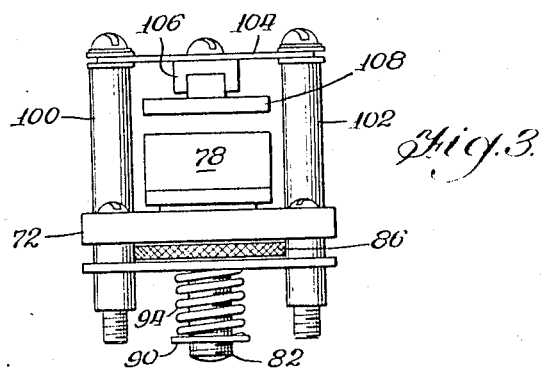
Figure 3 is a side elevational view of the modulation means illustrated in Figure 2.

The electromagnetic assembly 64 includes coils 20 and 62, is shown in Figure 2. These coils are spaced from each other and mounted parallel to each other on a solid plate shaped base 72. The coils 20 and 62 are provided with cores 74 and 76, respectively, of magnetic material, such as iron, and sleeves 78 and 80 are disposed about and insulated from the coils 20 and 62, respectively. The cores 74 and 76 are provided with outwardly extending threaded stems 82 and 84 which extend through the base 72, and nuts 86 and 88 threaded about the stems 82 and 84 secure the coils 20 and 62 to the base 72. The stems 82 and 84 are also provided with washers 90 and 92 which are secured thereto, and spiral springs 94 and 96 are disposed between the washers and a rigid base plate 98, thus maintaining the base plate 98 in contact with the nuts 86 and 88.

A pair of rigid spaced posts 100 and 102 are secured to the base plate 98 and extend normally therefrom through apertures 103 in the base 72. A wire shaped spring 104 is attached to the ends of the posts 100 and 102 opposite to the base plate 98, and the spring 104 is disposed parallel with the base 72 and normal to the axis between the cores 74 and 76. A channeled bar 106 is secured to the wire shaped spring 104 centrally thereof, and the bar 106 extends over the cores 74 and 76 of the coils 20 and 62. A pair of discs 108 and 110 are secured to the channeled member 106 confronting the coils 20 and 62, these discs being constructed of ferromagnetic material, such as iron. The discs 108 and 110 are spaced from the cores 74 and 76, and are resiliently maintained in alignment with the cores by the spring 104 and the springs 94 and 96.

The indicating means 16 employs a three stage amplifier 111 employing vacuum tubes 112, 114 and 116 connected in cascade, as illustrated in Figure 1. The first vacuum tube 112 has a control grid 118 connected to the center tap of the coil 20 through a coupling condenser 120 and resistor 122 connected in series. A variable resistor 123 is connected in the input circuit of vacuum tube 114 to provide a volume control. The third vacuum tube 116 of the amplifier 111 has a plate 124 connected to the positive terminal of the power source 26 through the primary winding of a transformer 128. The secondary winding of the transformer 128 is connected to a speaker 126. A rectifying bridge circuit 129 with four serially connected rectifiers 130 has one pair of opposite junctions connected between the plate connected end of the primary winding of the transformer 128 and the opposite end of the secondary winding of the transformer 128, a condenser 131 being connected between the plate end of the primary winding and the bridge circuit 129. A microammeter 132 is connected between the other pair of opposite junctions of the bridge circuit 129. The condenser 131 has a capacity small enough to form a high pass filter, in one particular construction 1000 micromicrofarads, thus making the bridge circuit respond to a change in the frequency of the signal from the amplifier 111.

The transducer 10 is shown in detail in Figure 5. It is mounted upon an arm 134 bent in the form of a right angle, and has an annular, cup shaped housing 136 constructed of aluminum, which is secured adjacent to one end of the arm 134. The crystal 50 is mounted within the closed end of an annular cup shaped crystal holder 138 disposed within the open end 139 of a cup shaped housing 136, the crystal 50 being disposed in the closed end 140 of a cup shaped holder 138. The crystal 50 is disposed within an indentation 141 on the inner-surface of the closed end 140 of the cup shaped holder 138.

An anular member 142 surrounds the cup shaped holder 138, and the holder 138 rests upon a shoulder 144 which extends inwardly from the annular member 142. The annular member 142 is rotatably attached to a ring 146 which is disposed about the annular member 142 by a pair of pins 148 on a common axis secured to the ring 146 and journaled within the annular member 142. The ring 146 is in turn pivotally mounted to the housing 136 by a pair of aligned pins 150 which are secured to the housing 136 and journaled in the ring 146.

A cover 152 abuts the surface of the closed end 140 of the cup shaped holder 138 and extends about the total periphery of the holder 138. The cover 152 fits snugly against the holder 138, the air between the holder 138 and the cover 152 having been removed, and is maintained in position by the force of the ambient air pressure. A coating of thin oil, such as SAE 10 grade, is disposed at the interface 153 between the cover 152 and the holder 138 to assure removal of air from the region between these surfaces.

Unless the cup shaped holder 138 and the cover 152 are constructed of suitable materials, the transmission of vibrations emanating from the crystal 50 is greatly impared. The inventor has found that certain plastic materials, namely Plexiglas and polystyrene, will transmit the vibrations without undue attenuation. Further, the transmission of vibrations through the holder 138 and cover 152 is greatly improved if the grain of these elements is not permitted to become aligned in a direction parallel to the surfaces of the crystal. For this reason both the holder 138 and cover 152 are molded, rather than fabricated from a rolled sheet.

The transducer 10 is adapted to slide upon the upper surface of a railroad rail. For this reason, a wheel 154 is rotatably secured to the end of the arm 134 opposite to the housing 136, and the wheel is adapted to rotate against the side of a rail, designated 155, to position the transducer 10 upon the rail, as illustrated in Figure 5. As the transducer 10 slides upon the rail 155, the cover 152 wears. The cover may be readily removed when worn out and replaced, the new cover being first coated with oil and then compressed against the holder 138.

The crystal 50 is provided with a silver coating on its flat surfaces, and electrical conductors 156 and 158 are connected to these electrically conducting surfaces. One of the conductors 156 extends through a slot 160 in the holder 138 and is electrically connected to the annular member 142 which is constructed of electrically conducting material, such as aluminum, the annular member 142 being electrically connected to the chassis. The other conductor 158 is connected to a terminal 162 mounted in a disc 164 constructed of electrically insulating material. The terminal 162 is electrically connected to the plate 22 of vacuum tube 18 through condenser 52, as explained above. The disc 164 is secured in position by a spanner nut 166 which is threaded into the annular member 142. The region within the cup shaped holder 138 between the closed end 140 thereof and the disc 164 is packed with loosely packed cotton 167 to provide proper damping for the crystal vibrations.

When the transducer 10 is placed in contact with a rail 155 which is free of flaws, the crystal 50 will assume a state of vibratory resonance with the rail at a representative frequency. Under these conditions, the frequency modulation of the oscillator produces a beat note which is audible and transmitted from the speaker 126.

The modulator 14 frequency modulates the oscillator 12 by periodically changing the position of the disc 108 in the field of the oscillator coil 20, thus changing the effective inductance of the coil 20 and the resonant frequency of the self excited oscillator 12. The continuously changing position of the disc 108 is provided as a result of the disc 108 being pivoted about an axis defined by the wire shaped spring 104. This is achieved due to the magnetic attraction of the core 76 and the disc 110, the disc 110 being disposed at the opposite end of the channeled bar 64 from the disc 108. The magnetic attraction between the core 76 and the disc 110 is periodic, this attraction only occurring during periods of time when the tube 58 is conducting and drawing current through the coil 62. The rate at which the modulator 14 operates is determined by the position of the variable resistor 68 connected to the grid 66 of vacuum tube 56, since the value of this resistor determines the decay period for the potential appearing upon the grid 66 of vacuum tube 56.

In the particular construction of the device described in this specification, the modulator 14 has a frequency of approximately 37½ cycles per second, and the oscillator 12 a resonant frequency of approximately 2980 kilocycles. The total frequency deviation of the oscillator 12 is approximately 300 kilocycles. The following table sets forth the values of the more important elements of the device.

| | |
|---|---|
| Crystal 50 | Fundamental frequency of 3000 kilocycles. |
| Condenser 48 | 100 mmfd. |
| Condenser 70 | 0.05 mfd. |
| Resistor 68 | 3.3 megohms potentiometer. |
| Condenser 32 | 1000 mmfd. |
| Resistor 28 | 47,000 ohms. |
| Condenser 120 | 1000 mmfd. |
| Resistor 122 | 120,000 ohms. |
| Condenser 52 | 0.01 mfd. |
| Condenser 54 | 8-50 mmfd. |
| Condenser 131 | 1000 mmfd. |
| Meter 30 | 0 to 1 micro ampere. |

The apparatus is assembled as illustrated in Figures 6 and 7. A web harness 170 adapted to be slipped over the head and rest upon the shoulders carriers a back knapsack 172, called the battery pack, and a light case 174 having a concave base 176, referring to Figure 6, which rests against the operator for assisting in centering the case on the operator's chest. A switch 178, the speaker 126, and a dial 180 connected to the volume control 123, heretofore identified in connection with the other figures, are located on the face of the casing 174. A flexible cable 182 is attached at one end to a coupler 184 and to one end of a handle 186 at the other end, the lower end of the handle 186 pivotally mounting the transducer 10. The complete unit weighs about 30 pounds.

In using the device, the operator first cleans the top of the rail ball. This may constitute little more than wiping off the rail with a rag, but if there is any noticeable rust, he may have to do a little scrubbing. He then spreads a film of oil over both rail ball ends above the joint. Standing as shown in Figure 6, he throws the switch 178, and as soon as the gauges read properly, and the pitch indicative of normal rail is reached, he commences to move the detector slowly along the rail. The pitch will change as he passes over each bolt hole and an experienced operator can move the detector at a constant rate and know how long the pitch should vary until the bolt hole has been passed over. A novice may have to stand directly over the detector and look down to line up the bolt hole. While the device is primarily intended to pick up fissures in the head, or longitudinally split heads, that is, a longitudinal separation in the rail ball itself, or at the point of joinder of the ball with the web, the device also picks up the beginning of a crack from the bolt hole. It is these fissures commencing at a bolt hole which have been undetectable for the standard rail car detector equipment. They cannot be seen and tight nuts and bolts on the joint bars keep the assembly rigid. The split frequently runs from one bolt hole to the next making the entire joint dangerous.

The advantages of applicant's fissure detector are several. Firstly, applicant's new self-excited oscillator provides a humanly audible signal of such uniformity and strength that ear phones may be removed. Not only is the ear phone a nuisance, but the reason that they are used is testimony to the weakness of the signal being studied. These devices are handled by men of little education, and it is important that the signal be strong, and particularly that the pitch difference between the signal from a good rail and the signal from a bad rail be great.

Another important advantage arises from the removable polystyrene cap. In existing apparatus, the crystal is mounted on the inside surface of the plastic sheet which engages the rail. The mounting of the crystal on this sheet requires factory precision. The plastic has very poor wear qualities when pushed along the top of steel with the result that whenever the plastic wall is worn through, not only must the entire crystal assembly be replaced by a new unit while a new plastic cap is being applied to the old at a factory, but all too frequently, the hole in the plastic sheet is discovered only after the crystal itself has been worn by pushing it in contact with the rail. Applicant's plastic polystyrene cap, machine surfaced to the plastic sheet carrying the crystal and held thereto by the capillary action of a very light oil, has been a great saver.

A third advantage of applicant's device resides in its construction which has resulted in great lightness.

The electromagnetic assembly 64 has a mechanical resonance which, as a practical matter, must be matched by the resonant frequency of the modulator 14. Since the frequency of the frequency modulator affects the frequency of the tone produced by the speaker 126, it is necessary to construct the electromagnetic assembly 64 with a mechanical resonance which will permit a suitable frequency of operation of the modulator 14. If the mechanical resonance frequency of the electromagnetic assembly 64 differs too greatly from the electrical resonant frequency of the modulator 14, the channeled bar 106 will cease to vibrate, and the oscillator 12 will no longer be frequency modulated. The permissible frequency difference between the resonant frequency of the modulator 14 and the mechanical resonant frequency of the electromagnetic assembly 64 is, of course, determined by the power output of the oscillator 12.

The electromagnetic assembly shown in Figures 8 through 10 and designated 200 has no appreciable mechanical resonances throughout the desired frequencies of operation. This electromagnetic assembly 200 replaces the electromagnetic assembly 64 in the ultrasonic fissure detector illustrated in Figures 1, 5, 6 and 7. The coil 62 of the modulator 14 is replaced by a primary winding of a transformer 206 having leads 202 and 204, the lead 202 being connected to the plate 60 of vacuum tube 58 and the lead 204 being connected to the positive terminal of battery 26. The transformer 206 has a secondary winding with leads 208 and 210, the lead 208 being connected to ground and the lead 210 being connected to an electromagnetic driver 212.

The electromagnetic driver 212 has a U-shaped support member 216 mounted on a support plate 218 which is electrically conducting and serves as a common ground. A plate 220 extends between the ends of the U-shaped support member 216 and is provided with a central aperture 222. A coil 224 is translatably mounted within the aperture 222 by a diaphragm 226 which is secured to the apertured plate 220. A hollow cylindrical magnet 228 is mounted to the U-shaped support member 216 confronting the aperture 222 in the plate 220, and the coil 224 extends into the magnet 228.

The coil 224 has a pair of leads 230 and 232, the lead 230 being connected to the lead 208 of the transformer 206, and the lead 232 being connected to the lead 210 of the transformer 206. The coil 224 is also attached to the end of a shaft 234 which is slidably disposed within an aperture 236 in an angle bracket 238, the angle bracket 238 being mounted to the support plate 218. A disc 240 constructed of magnetic materials, such as powdered iron disposed within a graphite matrix, is mounted to the end of the shaft 234.

The bracket 238 is U-shaped, and has a plate 242 confronting the aperture 236 therein. The coil 20 of the oscillator 12 is mounted to the plate 242 of the bracket 238 in adjacent, spaced relationship with the disc 240. A rectangular plate 244 is secured to the coil 20 and disposed adjacent to the plate 242 of the bracket 238. Four pins 246 are anchored in the corners of the plate 244 and pass through apertures 248 in the plate 242. Helical springs 250 are disposed about the pins 248, one end of the helical springs 250 abutting the surface of the plate 242 opposite to the coil 20 and the other ends abutting the heads 252 of the pins 246. A screw 254 is threadedly engaged within an aperture 256 located centrally between the four pins 246, and the end of the screw 254 abuts the plate 244. Rotation of the screw 254 positions the coil 20 relative to the rest position of the disc 240, thereby providing R. F. tuning of the oscillator 12. The four pins and helical springs 250 are effective to mount the coil 20 to the bracket 218 and provide a spring tension thereon to maintain the core 74 of the coil 20 in parallel confronting relationship with the disc 240.

It will be noted that the electromagnetic driver 212 is essentially the driver unit of a magnetic loud speaker, the cone of the speaker being removed and the shaft 234 being secured within the voice coil of the speaker. As a result, the freedom of mechanical resonance which is characteristic of loud speakers throughout the audible frequency range is obtainable for modulating the oscillator 12. It has been found that the most desirable tone is produced by the speaker 126 if the frequency of the modulator 14 is between 40 and 45 cycles per second, although rails may be tested with frequencies ranging from 20 to 55 cycles per second. The frequency of the oscillator 12 is varied over a range of approximately 350 kilocycles with a resonant center frequency of approximately 3,000 kilocycles.

From the foregoing description, the man skilled in the art will readily devise many other structures and modifications of the present structure which are intended to be within the scope of the present invention. It is therefore intended that the scope of the present invention be not limited by the foregoing description, but rather only by the appended claims.

The claimed invention is:

1. An ultrasonic fissure detector comprising an oscillator having a frequency determining inductance, an electro-mechanical transducer electrically coupled to the oscillator, a second inductance mounted parallel to the first inductance, a bar, spring mounting means secured to the bar between the first and second inductances pivotally mounting said bar adjacent to both inductances, a pair of ferromagnetic members mounted to the bar, one of said members being adjacent each of the inductances, means to periodically conduct an electrical current through the second of said inductances, whereby the bar is attracted to the second inductance and away from the first inductance to change the frequency of resonance of the oscillator, a transducer connected to the main circuit of the oscillator, an amplifier having its lead connected to the main circuit of the oscillator, and means connected to the delivery lead of the amplifier for translating amplified frequencies to audible signals.

2. An ultrasonic fissure detector comprising a self-excited oscillator having a frequency determining inductance, an electro-mechanical transducer electrically coupled to the oscillator, a second inductance mounted parallel to the first inductance, a bar, resilient mounting means secured to the bar between the first and second inductances pivotally mounting said bar adjacent to both inductances, a pair of ferromagnetic members mounted to the bar, one of said members being adjacent each of the inductances, a second oscillator including a vacuum tube and a plate to return electrode circuit including the second inductance, whereby the bar is attracted to the second inductance during periods of current flow in said second oscillator circuit to modulate the frequency of the oscillator, a transducer connected to the main circuit of the oscillator, an amplifier having its lead connected to the main circuit of the oscillator, and means connected to the delivery lead of the amplifier for translating amplified frequencies to audible signals.

3. An ultrasonic fissure detector comprising a self-excited oscillator, an electro-mechanical transducer electrically coupled to the oscillator, and means to frequency modulate the oscillator comprising a base, a pair of coils having parallel cores mounted to the base in parallel spaced relationship, the first of said coils being electrically connected to the frequency determining circuit of the oscillator, a pair of parallelly mounted posts disposed normal to the base, a resilient element mounted to the two posts and extended therebetween, a bar secured to the resilient element, a ferromagnetic member mounted to the bar being adjacent each of the coils, a second oscillator having a vacuum tube and a plate to return electrode circuit, the second coil of the modulation means being electrically connected in the output circuit of the second oscillator, whereby a periodic flow of current in the second coil attracts the confronting ferromagnetic member and modulates the frequency of the oscillator, a transducer connected to the main circuit of the oscillator, an amplifier having its lead connected to the main circuit of the oscillator, and means connected to the delivery lead of the amplifier for translating amplified frequencies to audible signals.

4. An ultrasonic fissure detector comprising a self-excited oscillator, an electro-mechanical transducer electrically coupled to the oscillator, and means to frequency modulate the oscillator comprising a periodic source of current, a plate shaped base, a pair of coils mounted to the base in parallel spaced relationship having cores extending through the base and outwardly therefrom, the first of said coils being electrically connected in the frequency determining circuit of the oscillator, and the second of said coils being electrically connected to the periodic source of current, a plate disposed generally parallel to the base, a pair of helical springs disposed about the outwardly extending portions of the cores, abutting the plate at one end, and secured to the core at the other end to spring bias the plate toward the plate shaped base, a pair of parallel posts mounted on a line normal to the axis between the cores, on opposite sides thereof, and normal to the base, said posts extending through apertures in the base, a wire shaped spring mounted to the posts and extending therebetween, a bar secured to the wire shaped spring, a ferromagnetic member mounted to the bar and being adjacent each of the coils, said members being spaced from the adjacent coils, whereby the periodic pulses from the source cause the ferromagnetic member confronting the second coil to be attracted to the second coil, thus frequency modulating the oscillator, a transducer connected to the main circuit of the oscillator, an amplifier having its lead connected to the main circuit of the oscillator, and means connected to the delivery lead of the amplifier for translating amplified frequencies to audible signals.

5. An ultrasonic fissure detector comprising a self-excited oscillator having a frequency determining circuit, a crystal electrically connected to the frequency determining circuit of the oscillator, a second oscillator having a vacuum tube and a plate to return electrode circuit, a plate shaped base, a pair of coils mounted to the base in parallel spaced relationship having threaded cores extending through the base and outwardly therefrom, the first of said coils being electrically connected in the frequency determining circuit of the oscillator, and the second of said coils being electrically connected in the circuit of the second oscillator, a pair of nuts threaded to the outwardly extending portions of the cores securing the cores to the plate shaped base, a plate disposed generally parallel to the base, a pair of helical springs disposed about the outwardly extending portions of the cores, abutting the plate at one end, and secured to the cores at the other end, thereby spring biasing the plate against the nuts, a pair of parallel posts mounted on a line normal to the axis between the cores and on opposite sides thereof, said posts being mounted normal to the plate and extending through apertures in the base a distance greater than the height of the cores, a wire shaped spring mounted to the ends of the posts opposite to the plate and extending between the posts, a bar secured to the wire shaped spring and extending over each of the cores, and a ferromagnetic member mounted to the bar being adjacent each of the cores, a transducer connected to the main circuit of the oscillator, an amplifier having its lead connected to the main circuit of the oscillator, and means connected to the delivery lead of the amplifier for translating amplified frequencies to audible signals.

References Cited in the file of this patent

UNITED STATES PATENTS

| | | |
|---|---|---|
| 2,334,593 | Wyckoff | Nov. 16, 1943 |
| 2,511,624 | D'Halloy | June 13, 1950 |
| 2,522,924 | Branson | Sept. 19, 1950 |
| 2,666,862 | Branson | Jan. 19, 1954 |
| 2,671,862 | Farrow | Mar. 9, 1954 |
| 2,729,785 | Keevil | Jan. 3, 1956 |